Aug. 16, 1932.  C. W. MILLER ET AL  1,872,486
BUS WHEEL DRIVING UNIT
Filed Sept. 22, 1930   4 Sheets-Sheet 3
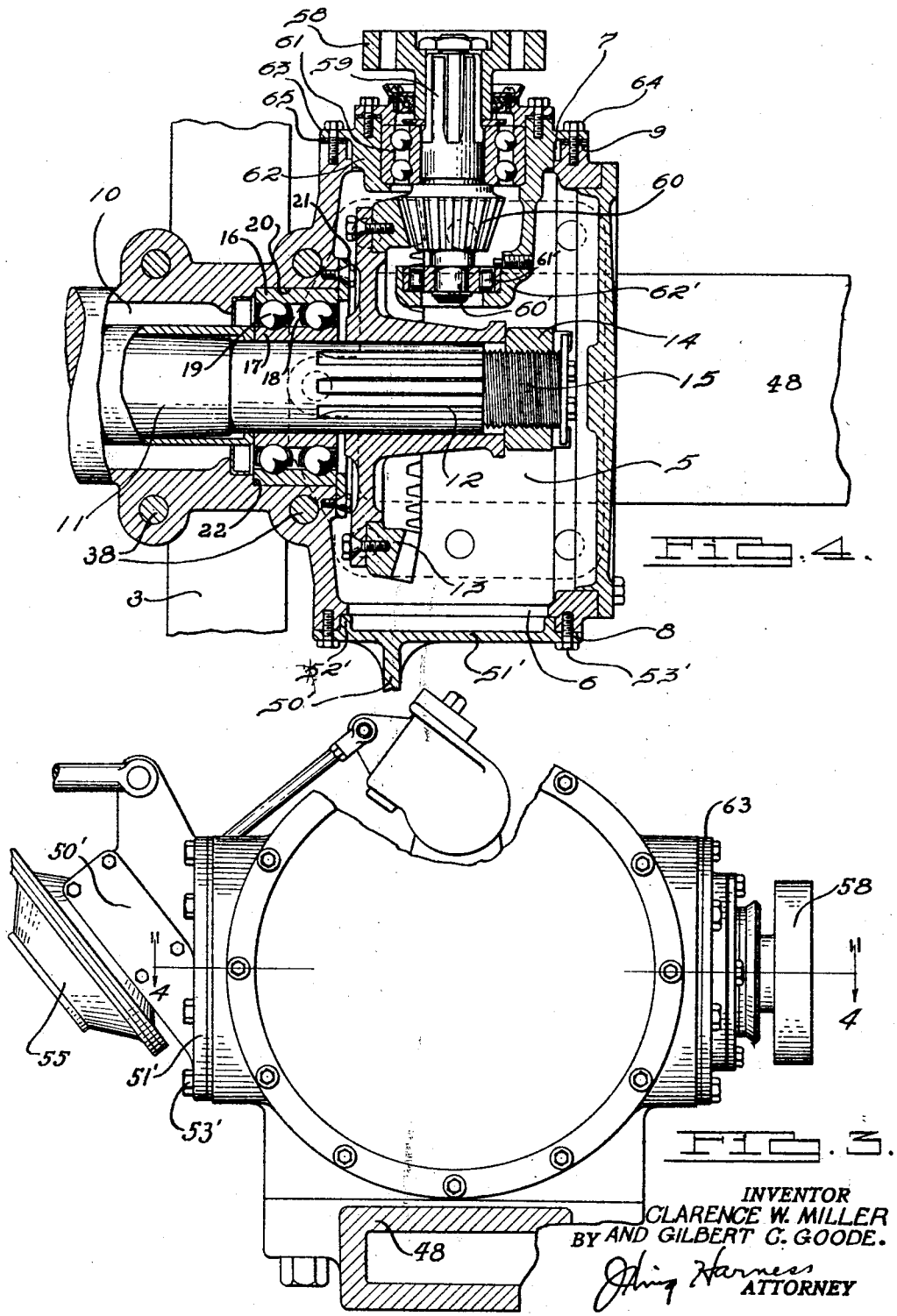
INVENTOR
CLARENCE W. MILLER
AND GILBERT C. GOODE.
BY
ATTORNEY Patented Aug. 16, 1932                                                                          1,872,486

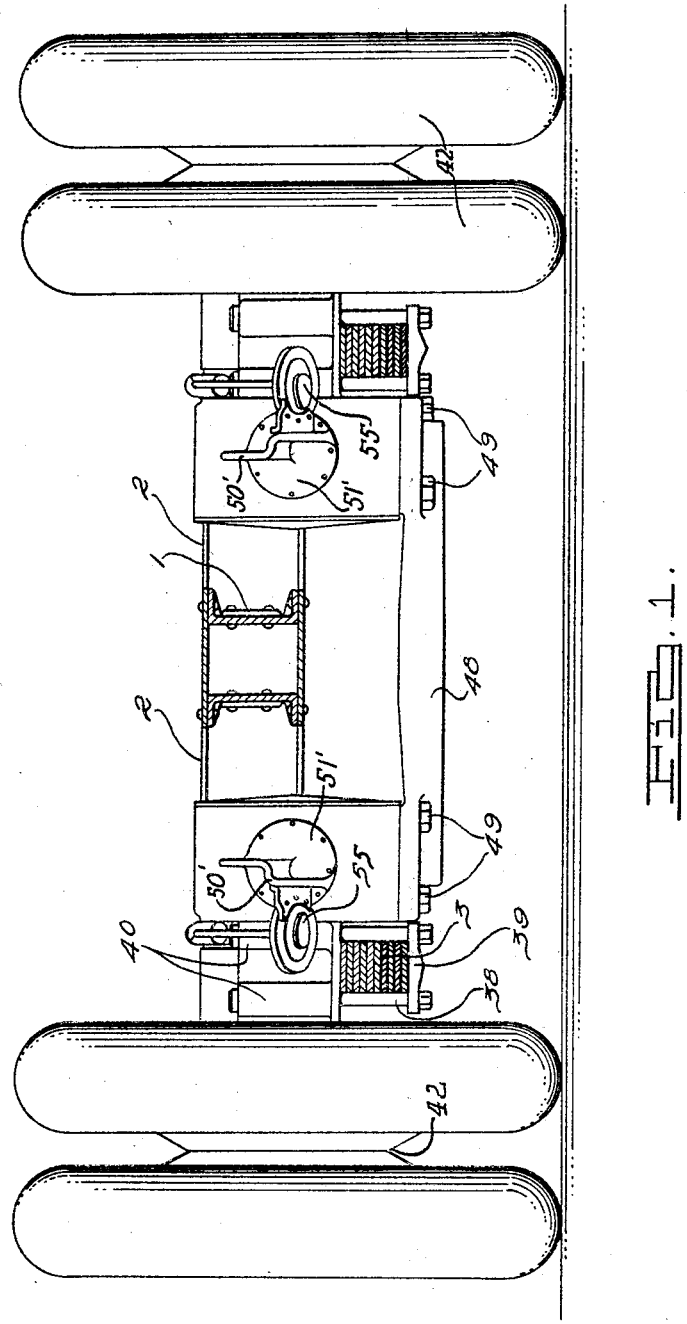

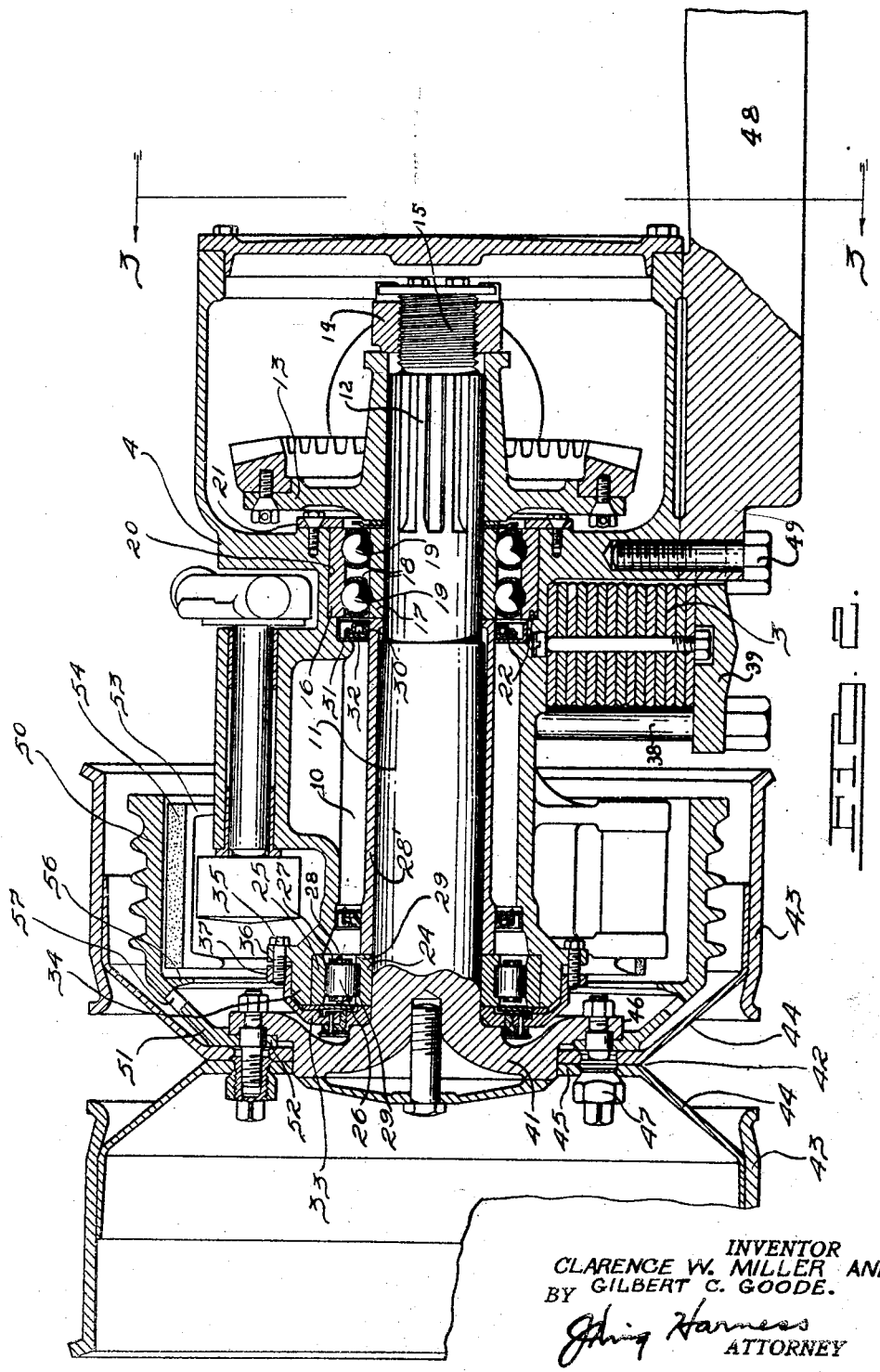

UNITED STATES PATENT OFFICE

CLARENCE W. MILLER, OF DETROIT, AND GILBERT C. GOODE, OF BIRMINGHAM, MICHIGAN, ASSIGNORS TO CHRYSLER CORPORATION, OF DETROIT, MICHIGAN, A CORPORATION OF DELAWARE

BUS WHEEL DRIVING UNIT

Application filed September 22, 1930. Serial No. 483,448.

This invention relates to an improved rear axle construction particularly for motor buses.

The main objects of the invention are to provide an improved rear axle and axle housing for individually driving the wheels of a motor bus; to provide a continuous axle of this kind which has an integral upset end portion forming a hub for independently supporting a vehicle wheel; and to provide a single continuous axle having a gear on one end which meshes with a driving shaft so as to directly drive a wheel on the other end of the axle.

Further objects of the invention are to provide a rear axle and housing therefor of the single wheel driving type which are interchangeable with respect to the right and left hand sides of a vehicle; to provide an axle housing which has openings in its respectively opposite ends in either one of which may be mounted, a driving shaft bearing and pinion, both of said ends being adapted to support brake mechanism; to provide a pair of springs each being located between one wheel of a pair of individually driven wheels and the driving member with which each wheel is associated; to provide an improved brake drum for separately driven wheels of this type which has an inwardly extending peripheral flange for preventing the oil and grease that escapes from the axle bearings from running onto the frictional surfaces of the brake mechanism; and to provide drain apertures in a brake drum through which oil may readily flow from the interior to the exterior of the drum without passing over the frictional brake surface thereof.

Other objects of the invention are to provide a bearing for a rear axle of this kind which includes an outer ball race having an unrestricted inner periphery around which beveled edges are formed so as to permit the structure to be assembled with an inner ball race and balls, or rollers, mounted on the axle and the outer ball race mounted in the housing; to provide a bearing of this kind which is adapted to allow the axle and the inner ball race thereon in which rollers are secured to move axially; and to provide a spacing sleeve for retaining a pair of bearing members in spaced relation which rotates with the axle.

An illustrative embodiment of our invention is shown in the accompanying drawings, in which:

Fig. 1 is a rear end elevation of a bus chassis showing our improved wheel driving units.

Fig. 2 is a central vertical section of a wheel driving unit embodying our invention.

Fig. 3 is an end elevation showing the wheel driving unit as viewed from line 3—3 of Fig. 2.

Fig. 4 is a horizontal section taken on line 4—4 of Fig. 3.

Figure 5:
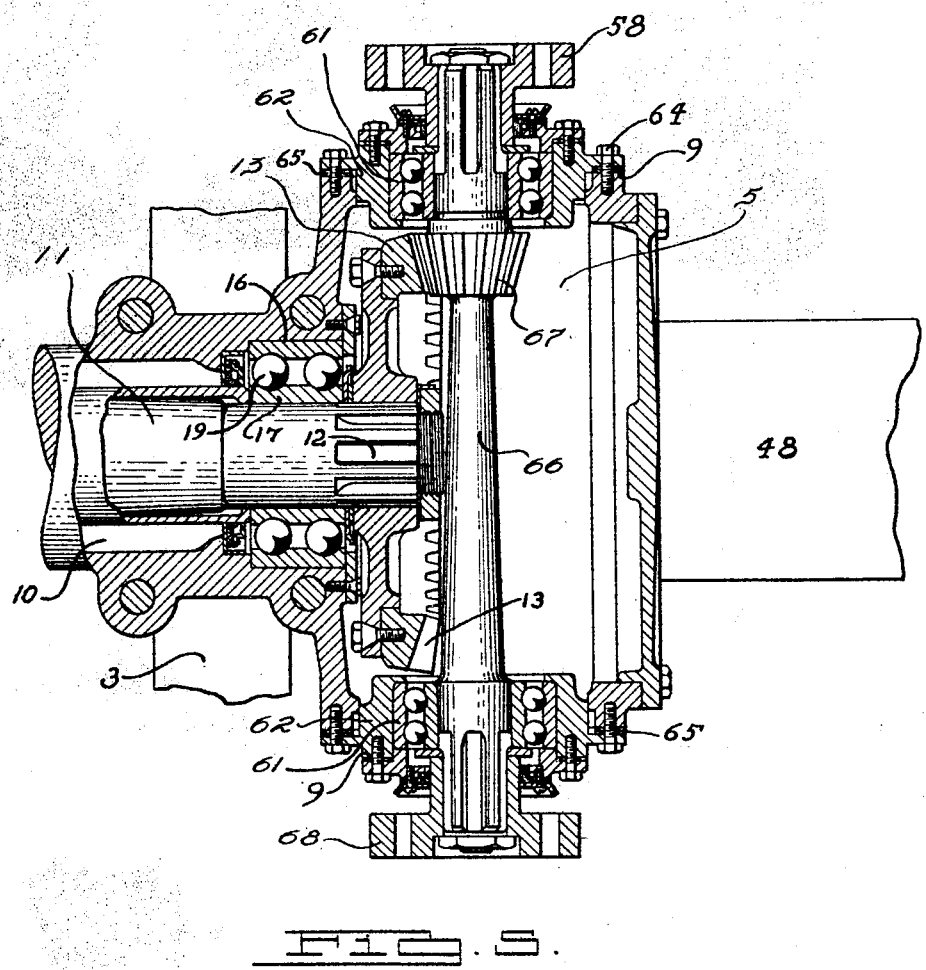
Fig. 5 is a horizontal section, similar to Fig. 4, showing a further development of our invention.

In the form shown, our improved wheel driving units are illustrated in conjuction with a vehicle chassis having a center beam or rib 1 on which outwardly extending lateral arms 2 are mounted. The wheel driving units are located between adjacent pairs of such lateral arms and are resiliently secured thereto by springs 3 of the type commonly used in vehicle construction. The wheel driving units of the respectively opposite sides of the chassis are identical and for the purpose of description only one unit will be described in detail.

The driving unit shown in section in Figs. 2 and 4 includes an axle housing 4 which has a passage 5 extending longitudinally of the chassis. Formed in the front and rear ends of the housing 4 are openings 6 and 7 respectively, around which machined seats 8 and 9 are provided on the extremities of the housing. The apertures and seats of both ends of the housing are substantially identical in size and construction to each other. Formed in the intermediate portion of the housing 4 is a laterally extending passage 10 through which an axle 11 extends. This axle has a splined end 12 located in the longitudinal passage 5 of the housing on which is secured a bevel gear 13. The gear 13 is held in place by a nut 14 on the inner threaded extremity 15 of the axle 11.

The right end of the axle as viewed in Fig.

2, is journaled in a bearing which includes inner and outer ball races 17 and 16 respectively between which spaced ball cages 18, having balls 19 therein, are confined. The outer race 16 is seated in a recess 20 formed in the axle housing 4 and is secured against axial movement relative to the housing by a ring 21 which firmly holds the race 16 against a shoulder 22 on the inner side of the housing. The left end of the axle 11 is journaled in a bearing which includes inner and outer ball races 24 and 25 respectively between which is located a series of rollers 26. The rollers 26 are held together by rings 27 which are located on the respectively opposite sides of the rollers and which have apertures for receiving pins 28 of the rollers. The rollers are also secured against longitudinal movement relative to the axle 11 by outwardly extending flanges 29 which are located adjacent the sides thereof. The edges of the outer race 25 are beveled as shown in Fig. 2 so as to permit relative movement between the rollers and the outer race. This construction also allows the axle 11 to be conveniently inserted into the housing while the inner race 24 and rollers 26 are in place on the axle. Located between the bearings of the right and left ends of the axle 11 is a spacing sleeve 28' in which the intermediate portion of the axle is received. This sleeve abuts the bearings at its extremities thereby holding them in spaced relation.

In order to prevent lubricant from freely flowing inwardly away from the bearings of the axle 11, leather rings or washers 30 are provided on the sleeve 28' adjacent the inner sides of the bearings. These rings are held in a metal support 31 and are resiliently urged against the outer periphery of the sleeve 28' by a coil spring 32 or other suitable means. The bearing in which the left end of the axle 11 is journaled is held against outward movement by a cap member 33 which is seated on a cylindrical projection 34 of the housing and secured thereto by bolts 35 which extend through registering apertures in a flange 36 on the housing and a flange 37 on the cap 33.

The housing 4 is secured to the spring 3 by bolts 38 which extend through a plate 39 adjacent the lower side of the spring and are threaded in bosses 40 formed on the sides of the housing. These bosses are located between the inner end of the axle 11 on which the bevel gear is mounted and the outer end of the axle which has an enlarged head or upset portion 41. Mounted on the upset end or head 41 is a road wheel 42 having spaced rims 43 on which disc members 44 are provided. The discs 44 are inclined and they converge at their inner extremities forming adjacent flanges or rings 45 which are located adjacent a peripheral flange 46 on the upset end of the axle. The rings 45 are firmly clamped upon the flange 46 by bolts 47 which extend through registering apertures in the rings and flange 46 respectively.

With the above construction the road wheel 42 is supported solely by the axle 11 which has a driving member, namely bevel gear 13, on its inner end by means of which the wheel 42 is driven directly by the axle 11. The driving unit of the right side of the vehicle is rigidly connected with the driving unit of the left side thereof by a tie bar 48 which is secured to the inner end portions of the driving units by bolts 49. In this manner the driving units are secured against relative movement with respect to each other although they are both free to move relative to the chassis frame by reason of the springs 3 upon which the driving units are supported, the extremities of the springs being shackled in a conventional manner to adjacent pairs of lateral arms 2 of the frame.

Mounted concentrically within the rim 43 of the road wheel 42 is a brake drum 50 which has an inclined side wall 51 and an integral ring portion or flange 52. This flange is located between the flange 46 of the upset end of the axle 11 and the ring 45 of the right hand disc 44 of the road wheel and it also is firmly clamped on the upset end 41 by bolts 47. A brake shoe 53 having a frictional element 54 is carried by the housing and located in registration with the inner periphery of the drum 50. This brake shoe is controlled by brake actuating mechanism which includes an air valve 55, the mechanism in general being commonly known as the Westinghouse air brake. The brake actuating mechanism is carried by a support 50' which has a plate or disc 51' conforming in shape with the end of the axle housing 4 in which the opening 6 is formed. This plate is held upon the seat 8 on the rear end of the housing by bolts 53' as shown in Fig. 3. Formed on the inner periphery of the brake drum 50 adjacent the left end edge of the brake shoe 53, as viewed in Fig. 2, is an inwardly extending flange 56 which prevents the oil that escapes from the interior of the housing from flowing onto the friction element 54 and the surface of the drum 50 with which the latter coacts. Apertures 57 are provided in the inclined wall 51 of the brake drum for allowing the oil to escape through the wall of the drum to the exterior thereof.

The vehicle is provided with separate engines, not shown, by which the axles 11 are independently driven. The driving shaft of the engine for the axle of the left driving wheel, for example, has a coupling member 58 on its rear end which is splined on a stem 59 of a pinion 60 as shown in Fig. 4. The stem 59 extends into the longitudinal passage 5 of the housing through the opening 7 therein and is journaled in a bearing 61 that is carried by a bearing support 62. The inner end of the pinion 60 has a stem 60' journaled in a bearing 61' which is carried by a support 62' integrally formed with the bearing support 62 and located in the interior of the housing. Formed on the bearing support 62 is a peripheral flange 63 which registers with the machined seat 9 on the end of the housing 4 and which is fastened thereon by bolts 64. Shims 65 are provided between the seat 9 and the flange 63 for properly spacing the teeth of the pinion 60 with respect to the teeth of the bevel gear 13. The plate 51' of the brake actuating mechanism support, and the bearing support 62 are interchangeable with respect to the front and rear ends of the axle housing and for this reason, with the above construction, axle housings of identical construction may be interchangeably used on the respectively opposite sides of the vehicle.

In some cases, it is found to be desirable to support the rear end of a vehicle or bus on two pairs of rear wheels and to drive through all of these wheels. The above vehicle wheel driving units may be readily conditioned for installation in a bus of this type by employing the structure shown in Fig. 5, wherein the driving unit of the front road wheel of a pair of longitudinally spaced driving wheels is illustrated. In general, the structure shown in Fig. 5 is identical in construction with that illustrated in Figs. 1 to 4 inclusive and accordingly corresponding or identical parts are designated by the same numbers. It should be understood that the structure shown in Fig. 5 is adapted to be aligned with and connected to the driving unit shown in Fig. 4.

In this form of our invention a shaft 66 extends longitudinally of the vehicle, through the passage 5 of the axle housing 4 and carries a pinion 67 which meshes with the bevel gear 13 on the axle 11. The shaft 66 is journaled at its respectively opposite ends in bearings 61 which correspond with the bearing 61 of Fig. 4 and which are carried by supports 62 also of the same construction as supports 62 of Fig. 2. Splined on the rear end of the shaft 66 is a coupling member 68 by which the shaft may be flexibly connected to the coupling member 58 of a driving unit of the type shown in Fig. 4.

Although but one specific embodiment of this invention has herein been shown and described, it will be understood that various changes including the size, shape and arrangement of parts may be made without departing from the spirit of our invention and it is not our intention to limit its scope other than by the terms of the appended claims.

We claim:

1. In a vehicle having a pair of laterally spaced driving axles, a pair of axle housings, each having opposed open ends and one rotatably supporting each axle, said axle housings being interchangeable with respect to the respectively opposite sides of said vehicle, a driving unit including a drive shaft fitted in one open end, and a closure fitted in the other open end of said housing having brake mechanism thereon, said driving unit and closure being interchangeable with respect to the open ends of said housing.

2. In a vehicle having a pair of spaced driving shafts, a pair of axles, a pair of axle housings, one rotatably supporting each axle and each having openings in its respectively opposite sides, both openings of each housing being adapted to receive said drive shafts so as to permit housings of a single construction to be employed interchangeably on the respectively opposite sides of said vehicle, seats on the sides of each of said housings, brake mechanism having a support on one of said seats, a bearing support on the other seat, said brake mechanism support and said bearing support being interchangeable with respect to said seats, and coacting driving members on said axles and shafts.

3. In a vehicle, an axle housing having side and end openings therein, an axle journaled in said side opening, a gear on the inner end of said axle, a closure for said end opening having a bearing therein and including an inwardly extending support having a bearing spaced from the bearing of said closure, and a drive shaft journaled in said bearings having a pinion between the latter meshed with the gear of said axle.

4. In a vehicle, an axle housing having opposed end openings and a side opening, an axle journaled in said side opening, a gear on said axle, a driving unit fitted in one of said end openings including a unitary structure having spaced bearings and a drive shaft journaled therein having a pinion between said bearings meshed with said gear, and a closure fitted in the other end opening having brake mechanism thereon, said driving unit and closure being interchangeable with respect to the opposed end openings of said housing.

CLARENCE W. MILLER.
GILBERT C. GOODE.